United States Patent [19]

Kamejima et al.

[11] Patent Number: 4,652,803
[45] Date of Patent: Mar. 24, 1987

[54] GUIDANCE SYSTEM

[75] Inventors: Kohji Kamejima; Yuriko Ogawa, both of Ibaraki, Japan

[73] Assignee: Hitachi, Ltd., Tokyo, Japan

[21] Appl. No.: 825,976

[22] Filed: Feb. 4, 1986

[30] Foreign Application Priority Data

Feb. 8, 1985 [JP] Japan ................................. 60-21692

[51] Int. Cl.⁴ ............................................. G05D 1/00
[52] U.S. Cl. ................................... 318/587; 318/568; 364/513; 364/424
[58] Field of Search ................... 318/587, 568 D, 580, 318/567, 569; 364/478, 513, 424; 340/723, 724, 988; 382/16, 28, 30, 37, 38

[56] References Cited

U.S. PATENT DOCUMENTS

| | | | |
|---|---|---|---|
| 4,014,000 | 3/1977 | Uno | 382/30 |
| 4,146,924 | 3/1979 | Birk | 318/568 |
| 4,380,696 | 4/1983 | Masaki | 364/513 |
| 4,458,321 | 7/1984 | Whitney | 364/513 |
| 4,486,775 | 12/1984 | Catlow | 382/30 |
| 4,504,970 | 3/1985 | Werth | 364/513 |
| 4,611,347 | 9/1986 | Netravali | 382/38 |

FOREIGN PATENT DOCUMENTS 0115462 8/1984 European Pat. Off. ............ 382/30

OTHER PUBLICATIONS

"The Stanford Cart and the CMU Rover", H. P. Moravec, 2/24/83.

*Primary Examiner*—William M. Shoop, Jr.
*Assistant Examiner*—Patrick C. Keane
*Attorney, Agent, or Firm*—Antonelli, Terry & Wands

[57] ABSTRACT

The present invention consists of comparing a feature pattern extracted from an actual observed image and the prediction pattern of an environmental object predicted in relation to the positional information of a mobile object and finding the difference between both the patterns and then guiding and controlling a mobile object so as to reduce the difference, in that a selection sequence rule of the environmental objects serving as guidance targets is selected and applied by an operator and that the prediction patterns for the guidance targets are created in accordance with the selection sequence rule of the objects.

Thus, the comparisons between the prediction patterns of the objects according to the selection sequence rule selected and applied beforehand and the feature pattern from the observed image can be made quickly and accurately, so that the autonomous guidance of the mobile object can have the reliability enhanced more.

8 Claims, 4 Drawing Figures

GUIDANCE SYSTEM

BACKGROUND OF THE INVENTION

The present invention relates to a guidance system for a mobile object such as robot, and more particularly to a guidance system which can move a mobile object to a destination in adaptation to an environment upon understanding the surrounding situation.

Most of robots presently operating are used under well-ordered environments such as factories. In recent years, however, mobile robots usable also outside the well-ordered environments hve been required. In order to realize the requirement, a robot needs to be given an autonomous moving function.

An example of such a mobile robot is disclosed in a literature by Moravec, entitled "The Stanford Cart and The CMU Rover" published on Feb. 24, 1983. With the mobile robot of this type, an image obtained with a television camera is processed to extract the feature points of the image, a three-dimensional object distribution involving a direction and a distance is calculated on the basis of the distribution of the feature points, and a distance to an object is found on the basis of the calculated result, whereupon a guidance signal is delivered to the mobile robot proper. In such image processing, complicated calculatons are necessary for the detection of the feature points and the extraction of the three-dimensional information. It has therefore been difficult to move the mobile object at high speed and at high precision.

SUMMARY OF THE INVENTION

An object of the present invention is to provide a guidance system which selectively applies the patterns of objects in an environment serving as the guidance targets of a mobile object, thereby to facilitate image processing.

Another object of the present inventon is to provide a guidance system which can guide a mobile object at high speed and at high precision.

The present invention for accomplishing the objects consists, in comparing a feature pattern extracted from an actual observed image and the prediction pattern of an environmental object predicted in relation to the positional information of a mobile object and finding the difference between both the patterns and then guiding and controlling the mobile object so as to reduce the difference, in that the selection sequence rule of the environmental objects serving as guidance targets is selected and applied by an operator and that the prediction patterns for the guidance targets are created in accordance with the selection sequence rule of the objects.

Thus, the comparisons between the prediction patterns of the objects according to the selection sequence rule selected and applied beforehand and the feature pattern from the observed image can be made quickly and accurately, so that the autonomous guidance of the mobile object can have the reliability enhanced more.

DETAILED DESCRIPTION OF THE PREFERRED EMBODIMENTS

Now, embodiments of the present invention will be described with reference to the drawings.

Figure 1:
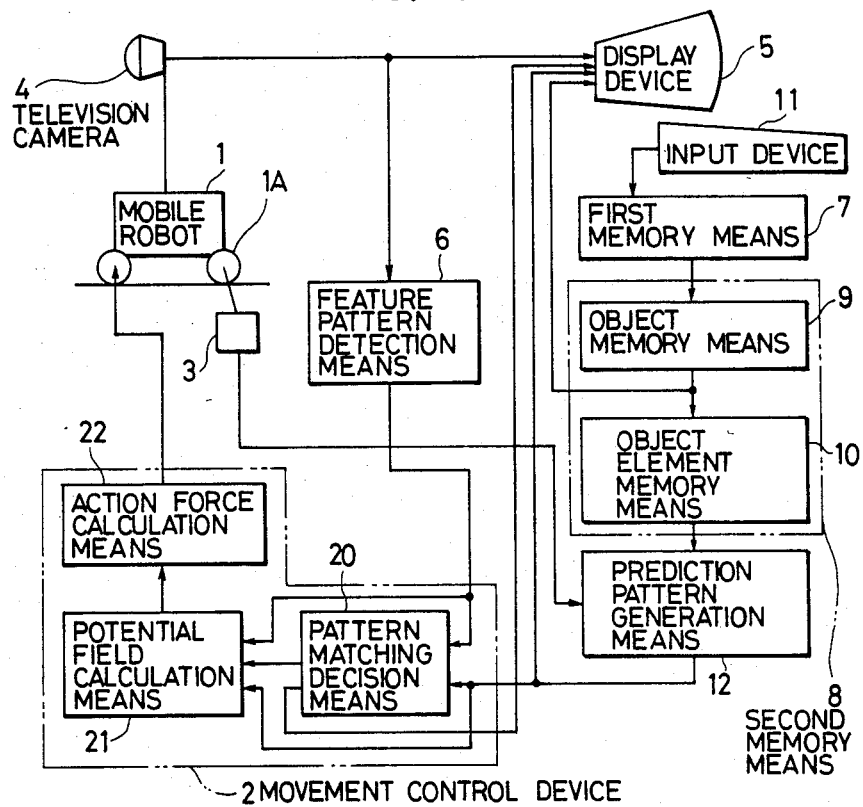
FIG. 1 is a diagram showing the arrangement of an embodiment of the system of the present invention.
Figure 2:
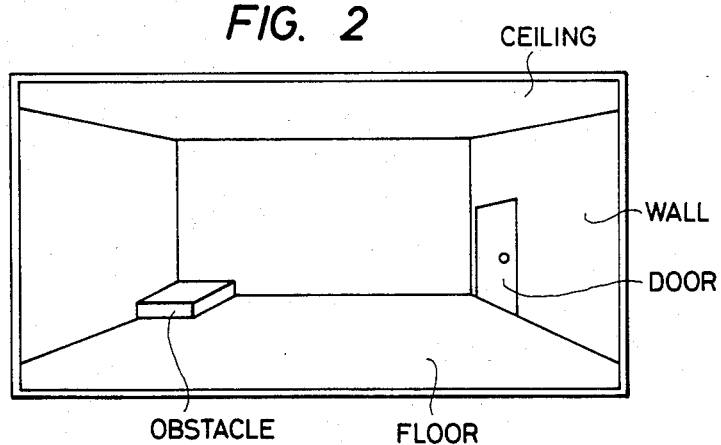
FIG. 2 is a view showing a room which is an example of the guidance space of a mobile object that is guided by the system of the present invention.
Figure 3:
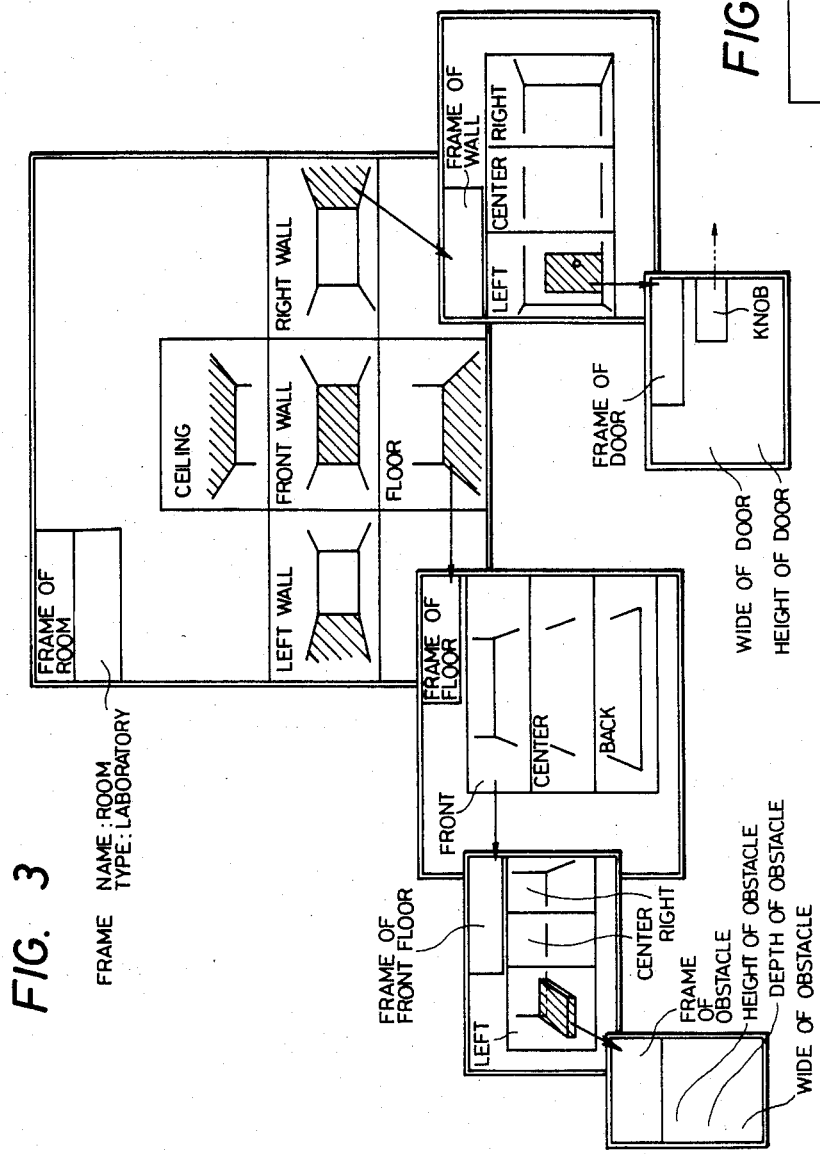
FIG. 3 is an explanatory view showing the frame contents of the room shown in FIG. 2, which are stored in object memory means and object element memory means constituting the system of the present invention.

FIG. 1 shows one embodiment of the system of the present invention. In this figure, numeral 1 designates a mobile robot, which is furnished with a vehicle mechanism 1A for running within a specified environmental region. The vehicle mechanism 1A of the mobile robot 1 is controlled by a movement control device 2, and the movement magnitude thereof is detected by a movement magnitude detector 3. A television camera 4 for imaging the surrounding enivornment is installed on the mobile robot 1. An image picked up by the television camera 4 is delivered to a display device 5, and also to feature pattern detection means 6. The feature pattern detection means 6 detects the feature pattern of the observed image. First memory means 7 stores the selection sequence rules of environmental objects. Second memory means 8 is constructed of object memory means 9 and object element memory means 10. The object memory means 9 stores the environmental objects on the basis of the so-called frame theory. For example, as regards a room shown in FIG. 2, the object memory means 9 stores the frame of the room, the frame of a floor, the frame of a wall, etc. hierarchically as illustrated in FIG. 3. In association with the object memory means 9, the object element memory means 10 stores object elements, for example, the height, depth and width of an obstacle for the frame of the obstacle as illustrated in FIG. 3. The object memory means 9 mentioned above delivers the list of the environmental objects to the display device 5. An input device 11 is manipulated by an operator so as to select and apply the selection sequence rule of the environmental objects which serve as the guidance targets of the mobile object. Prediction pattern generaton means 12 reads out the information items of the selected object within the enviromental region and the elements thereof from the object memory means 9 and the object element memory means 10 respectively and finds the prediction pattern of the object on the basis of the positional information of the mobile robot received from the movement magnitude detector 3, and it delivers the prediction pattern to the display device 5 and the movement control device 2. The movement control device 2 comprises pattern matching decision means 20 to decide the propriety of the matching between the feature pattern from the feature pattern detection means 6 and the prediction pattern from the prediction pattern generation means 12 and to deliver an "mismatch" signal to the display devie 5 when the matching is improper, potential field calculation means 21 to respond to a "match" signal from the pattern matching decision means 20 to calculate the field of a potential $\phi_A$ acting between the prediction pattern and the feature pattern, for the purpose of controlling the vehicle mechanism 1A of the mobile robot 1 so as to diminish the deviation of both the patterns, and action force calculation means 22 to calculate the gradient vector of the force of action $F_B$ of the feature pattern on the prediction pattern as established by the field of the potential $\phi_A$ and to deliver the gradient vector as a guidance signal.

Next, the interaction $\Phi_{AB}$ between the aforementioned patterns will be described.

Figure 4:
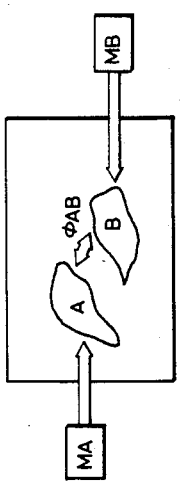
FIG. 4 is an explanatory diagram showing the principle of pattern matching which is employed in a movement control device constituting the system of the present invention.

Hereunder, in order to simplify the description, it is assumed that a space S be a screen as shown in FIG. 4 and that patterns A and B be binary images. Here, it is assumed that the pattern A be a pattern based on an observed image, while the pattern B be a pattern based on a predicted image created with an environment model K. Now, when the pattern A has been given, an adaptation law for bringing the position of the pattern B close to the pattern A needs to be found out. This adaptation law is obtained by introducing the potential $\phi_A$ which is produced on the space S by the pattern A. The potential $\phi_A$ can be evaluated according to the following equation (1):

$$\alpha\phi_A + X_A = 0 \tag{1}$$

Here, $\alpha$ denotes a differential operator of $$\sigma_x \frac{\partial^2}{\partial x^2} + \sigma_y \frac{\partial^2}{\partial y^2} \cdot \sigma_x$$

and $\sigma_y$ are parameters which denote the spacial extents of the potential $\phi_A$. In addition, $X_A$ in Eq. (1) is a characteristic function in the case where the pattern A is regarded as the subset of the space S.

Next, the action $F_B$ to which the pattern B is subjected by the field of the above-stated potential $\phi_A$ of the pattern A on the space S can be evaluated according to Eq. (2) given below. Here, in order to facilitate the description, only movements in x-axial and y-axial directions within a two-dimensional plane shall be handled.

$$F_B = \int_s X_B \cdot D \, \phi_A \, ds \tag{2}$$

Here, $X_B$ is a characteristic function in the case where the pattern B is classed with the subset of the space S, and D denotes a gradient operator, namely, a differential operator of $$\left( \sigma_x \frac{\partial^2}{\partial x^2}, \sigma_y \frac{\partial^2}{\partial y^2} \right)'.$$

In accordance with Eqs. (1) and (2) mentioned above, it is possible to obtain information for transforming the pattern B relative to the pattern A, that is, the guidance information of the mobile robot. Since, however, Eq. (1) in this computation includes simultaneous equations of infinite dimensions, the use of the following approximation equation is favorable;

$$\frac{\partial \phi_A}{\partial t} = \alpha \Phi_A + X_A \tag{3}$$

The output $U_B$ of a manipulation mechanism $M_B$ for manipulating and moving the pattern B to the pattern A by the use of the solution of the potential $\phi_A$ in Eq. (3) given above can be evaluated according to the following equation (4):

$$U_B = -\int_s X_B \cdot D \, \phi_A \, ds \tag{4}$$

Next, the operation of the foregoing embodiment of the system of the present invention will be described.

Prior to the initiation of the guidance of the mobile robot 1, the observed image from the television camera 4, the object list from the object memory means 9 and the prediction pattern from the prediction pattern generation means 12 are displayed on the display device 5. Meanwhile, the feature pattern detection means 6 detects the feature pattern from the observed image and delivers it to the pattern matching means 20. In addition, the prediction pattern generation means 12 delivers the prediction pattern to the pattern matching means 20 on the basis of the movement magnitude from the movement magnitude detector 3. The pattern matching means 20 delivers the "mismatch" signal to the display device 5 when the matching between both the patterns is impossible. Subsequently, on the basis of the "pattern mismatch" display indicated on the display device 5, the operator applies the selection sequence rule of the information items of the objects serving as the guidance targets of the mobile robot 1, to the first memory means 7 by the use of the input device 11 by referring to the observed image, the object list from the object memory means 9 and the prediction pattern from the prediction pattern generation means 12 which are indicated on the display device 5. Upon completion of this selection, the prediction pattern generation means 12 reads out the distribution and configuration data of the object from the object memory means 9 and the object element memory means 10 respectively in accordance with the selected rule and evaluates the prediction pattern of the object. This prediction patter is applied to the display device 5. Thus, when the operator has judged the prediction pattern improper by referring to the observed image and the prediction pattern displayed on the display device 5, he/she manipulates the input device 11 so as to obtain the prediction pattern of another object from the object memory means 9 and to indicate it on the display device 5. When this prediction pattern has been judged proper, it is applied to the movement control device 2 through operator's manipulation of the input device 11. The movement control device 2 is also supplied with the feature pattern of the observed image from the feature pattern detection means 6. In consequence, the movement control device 2 compares the feature pattern with the prediction pattern and supplies the vehicle mechanism 1A of the mobile robot 1 with the guidance signal for guiding the mobile robot 1. Thus, the mobile robot 1 is guided and controlled to a target spot.

As described above, the operator can apply the selection sequence rule of environmental objects with the input device 11 and select the prediction pattern of an object element corresponding to a certain object element in a feature pattern. In this way, the matching between the feature pattern and the prediction pattern is appropriately performed, so that the mobile robot can be guided at high speed and at high precision.

While, in the foregoing, the mobile robot has been described by way of example, the invention is not restricted thereto.

As thus far described, according to the present invention, a prediction pattern to be compared with the feature pattern of an observed image can be applied and set by selecting a rule, so that a very long time is not required for image processing as in the prior art. Therefore, a mobile object can be guided at high speed and at high precision.

What is claimed is:

1. A guidance system wherein a mobile object is guided along a path within a predetermined environment, comprising:

first memory means to store prediction patterns of objects within the environment, second memory means to store an extraction sequence of the prediction patterns of the objects stored in said first memory means, a control device which compares for matching the prediction pattern obtained from said first and second memory means and a further pattern obtained from an observed image, on the basis of positional information of the mobile object, and which delivers a guidance signal to the mobile object so as to diminish a difference between both the patterns when the pattern matching is possible and delivers a "pattern mismatch" signal thereto when the matching is impossible, a display device which responds to the "pattern mismatch" signal from said control device to display this signal and to display an image of an object within the environment and the prediction pattern of an object, and input means to command said second memory means to select the prediction pattern associated with the displayed object image, on the basis of the "pattern mismatch" display on said display device.

2. A guidance system according to claim 1, wherein said first memory means comprises object memory means to store the prediction patterns of the objects within the environment hierarchically, and object element memory means to store geometrical data of the objects.

3. A guidance system according to claim 2, wherein said second memory means delivers a plurality of prediction patterns to said display device on the basis of the selection command from said input means.

4. A guidance system according to claim 2, wherein said second memory means delivers one prediction pattern to said display device and said control device on the basis of the selection command from said input means.

5. A guidance system wherein a mobile object is guided along a path within a predetermined environment, comprising:

first memory means to store objects within the environment and a distribution thereof, second memory means to store an extraction sequence of the objects stored in said first memory means, prediction pattern generation means to receive data of an object associated with positional information of the mobile object from said first memory means and to evaluate a prediction pattern of the associated object on the basis of the positional information of the mobile object, image input means to pick up an image, feature pattern generaton means to extract a feature pattern from the image applied by said image input means, a control device which compares for matching the prediction pattern from said prediction pattern generation means and the feature pattern from said feature pattern generation means, and which delivers a guidance signal to the mobile object so as to diminish a difference between both the patterns when the pattern matching is possible and delivers a "pattern mismatch" signal thereto when the matching is impossible, a display device which responds to the "pattern mismatch" signal from said control device to display this signal and to display an image of an object within the environment and the prediction pattern of an object, and input means to command said second memory means to select the prediction pattern associated with the displayed object image, on the basis of the "pattern mismatch" display of said display device.

6. A guidance system according to claim 5, wherein said first memory means comprises object memory means to store the objects within the environment hierarchically, and object element memory means to store geometrical data of the objects.

7. A guidance system according to claim 6, wherein said second memory means delivers a plurality of prediction patterns to said display device on the basis of the selecting command from said input means.

8. A guidance system according to claim 6, wherein said second memory means delivers one prediction pattern to said display device and said control device on the basis of the selection command from said input means.

* * * * *